United States Patent [19]

Holm

[11] 4,140,183
[45] Feb. 20, 1979

[54] MICELLAR FLOODING PROCESS FOR HETEROGENEOUS RESERVOIRS

[75] Inventor: LeRoy W. Holm, Fullerton, Calif.

[73] Assignee: Union Oil Company of California, Brea, Calif.

[21] Appl. No.: 877,076

[22] Filed: Feb. 13, 1978

[51] Int. Cl.² .................. E21B 43/22; E21B 33/138
[52] U.S. Cl. .................... 166/270; 166/263; 166/273; 166/292; 166/293; 166/295
[58] Field of Search ............ 166/263, 270, 273, 274, 166/285, 292, 293, 294, 295, 300, 305 R

[56] References Cited

U.S. PATENT DOCUMENTS

| | | | |
|---|---|---|---|
| 2,786,530 | 3/1957 | Maly | 166/263 |
| 2,976,926 | 3/1961 | Maly | 166/263 |
| 3,152,640 | 10/1964 | Marx | 166/263 X |
| 3,175,611 | 3/1965 | Hower | 166/292 |
| 3,386,509 | 6/1968 | Froning | 166/292 |
| 3,548,943 | 12/1970 | Simon et al. | 166/292 |
| 3,704,990 | 12/1972 | Sarem et al. | 166/273 |
| 3,762,476 | 10/1973 | Gall | 166/270 X |
| 3,882,938 | 5/1975 | Bernard | 166/270 |
| 4,011,908 | 3/1977 | Holm | 166/273 |
| 4,037,659 | 7/1977 | Holm | 166/273 |

*Primary Examiner*—Stephen J. Novosad
*Assistant Examiner*—George A. Suchfield
*Attorney, Agent, or Firm*—Richard C. Hartman; Dean Sandford; Gerald L. Floyd

[57] ABSTRACT

A process for recovering oil from a heterogeneous subterranean reservoir having strata of widely varying permeability by injecting therein via a well a slug of a micellar solution followed by an aqeuous drive fluid wherein, at some time prior to the injection to all of the slug of the micellar solution, there is injected into the reservoir one or more aqueous solutions of reagents that react in the reservoir to form a plugging material, one of which reagents contains a polyvalent cation. After the plugging material has formed, the well is produced to remove from the reservoir the unreacted reagent containing a polyvalent cation which polyvalent cation would otherwise react with and reduce the efficiency of the subsequently injected micellar solution.

25 Claims, No Drawings

MICELLAR FLOODING PROCESS FOR HETEROGENEOUS RESERVOIRS

BACKGROUND OF THE INVENTION (a) Field of the Invention

This invention relates to the recovery of oil from subterranean heterogeneous petroleum-bearing reservoirs, and more particularly to such recovery by an enhanced oil recovery process involving plugging the higher permeability channels of the reservoir, injecting a micellar solution, and injecting a drive fluid.

(b) Description of the Prior Art

It has long been recognized that substantial amounts of oil remain unrecovered at the completion of normal primary recovery operations. This is especially true of reservoirs having heterogeneous permeability. Hence, various secondary and tertiary methods of recovering additional quantities of oil have been developed, such as methods involving the injection via one or more injection wells of a micellar solution to drive additional oil toward one or more production wells spaced apart in the reservoir from the injection well. The micellar solution can be followed by a drive fluid. Heterogeneity in the reservoir structure often results in the injected fluid not being uniformly distributed throughout that portion of the reservoir being treated. Thus, various processes have developed for improving the volumetric sweep efficiency of injected enhanced recovery fluids. U.S. Pat. No. 3,882,938 to Bernard describes such a process wherein there is sequentially injected into a heterogeneous reservoir; (a) a first portion of a soluble oil solution, (b) one or more aqueous solutions of reagents that react together in the reservoir to form a plugging material that reduces the permeability of the more permeable strata of the reservoir, (c) a second portion of the soluble oil solution, and (d) an aqueous drive fluid. It has been found that some of the plug-forming reagents have a tendency to react with the surface active agent component of the soluble oil solution to form a polyvalent metal salt. The soluble oil is then less effective in lowering the surface tension between the reservoir oil and the subsequently injected aqueous drive fluid. Thus, less oil will be mobilized in the reservoir during the recovery process.

Accordingly, a principal object of this invention is to provide an improved enhanced oil recovery process for reservoirs having heterogeneous permeability.

Another object of this invention is to provide such a process involving the use of a micellar solution.

Still another object of this invention is to provide such a process for increasing the volumetric sweep efficiency of a small amount of a micellar solution injected ahead of a drive fluid.

A further object of this invention is to provide such a process wherein the efficiency of the micellar solution for sweeping oil from the reservoir is maintained.

Other objects, advantages and features of this invention will be apparent from the following detailed description:

SUMMARY OF THE INVENTION

Briefly, this invention contemplates a process for recovering oil from a heterogeneous subterranean reservoir having strata of widely varying permeabilities by an enhanced recovery process in which there is injected into the reservoir through an injection well a micellar solution, one or more aqueous solutions of reagents that react in the reservoir to form a plugging material, and a drive fluid. The aqueous solutions of plug-forming reagents, at least one of which contains a polyvalent cation, are injected at least prior to the injection of all of the micellar solution. After the plugging material has formed, and before the injection of the remainder of the micellar solution, the injection well is produced for a length of time and at a rate sufficient to remove from the reservoir unreacted quantities of the polyvalent cation component of the plug-forming reagents.

DETAILED DESCRIPTION OF THE INVENTION

Enhanced oil recovery processes for heterogeneous reservoirs are known in which aqueous solutions of plug-forming reagents, at least one of which contains a polyvalent cation, are injected to plug the more permeable strata. Subsequently, injected micellar solutions and drive fluids thus desirably penetrate the less permeable strata of the reservoir and increase the volumetric sweep efficiency of the enhanced oil recovery fluid. In some instances, such as due to inadequate mixing in the reservoir, incomplete reaction or use of an excess of one reagent, there remains in the reservoir, after the plugging material has formed, an appreciable amount of unreacted polyvalent cations. When micellar solutions are injected into reservoirs containing unreacted polyvalent cations and contact the polyvalent cations, the surface active component of the micellar solution could react with the polyvalent cations. This would decrease the efficiency of the micellar solution in reducing the interfacial tension between the reservoir oil and the aqueous drive fluid, which in turn would decrease the ability of the enhanced oil recovery fluids to mobilize oil in the reservoir. To maintain the integrity of the micellar solution, it is proposed to produce the well treated with the plug-forming reagents after the plug has formed and before injection of additional micellar solution. The well is produced for a length of time and at a rate calculated to remove from the reservoir unreacted polyvalent cations which were injected in the plug-forming step. Production of the well is continued until the polyvalent cation content of the produced fluids falls below a predetermined amount. The remaining amount of the micellar solution and the drive fluid can then be injected with a reduced possibility that the micellar solution will contact and react with polyvalent cations in the reservoir.

The aqueous solution or solutions of reagents that react in the reservoir to form plugging materials can be injected into the reservoir prior to injection of the micellar solution or these reagent solutions can be staged with the micellar solution wherein a first portion of the micellar solution is injected, followed by the injection of the aqueous reagent solutions, then by a second portion of the micellar solution.

While the flooding process of this invention is particularly adapted for the recovery of oil from heterogeneous reservoirs, as a practical matter, most petroleum reservoirs exhibit some heterogeneity, and thus oil recoveries are improved in most naturally occurring petroleum reservoirs by treatment with the process of this invention. By heterogeneity, it is meant that the reservoir is comprised of stratified layers of varying permeability, or that it contains fractures, cracks, fissures, streaks, vuggs, or zones of varying permeability that cause injected fluids to advance through the reservoir non-uniformly. Thus, the formations that are particularly amenable to treatment by the process of this invention are those formations that have strata or zones of different permeabilities, such as strata having permeabilities varying by 50 millidarcies or more, or which otherwise are structurally faulted so that the injected flooding composition does not advance through the formation at a substantially uniform rate along the entire flood front, but instead, streaks or fingers through these more permeable zones. Volumetric sweep efficiency is improved and oil recoveries increased as the flood front is rendered more uniform. The term "volumetric sweep efficiency" as used herein is defined as the product of the horizontal and vertical sweep efficiencies.

In treating those reservoirs having highly permeable streaks or channels which contain negligible or only a relatively small proportion of the total oil present in the reservoir, it is preferred to inject the aqueous solution of reactive plugging agent prior to injecting the micellar solution. The plugging agent solution preferentially enters the more permeable streak or channel whereupon it reacts to form a plugging material therein, whereby the subsequently injected micellar solution is diverted to the less permeable zones of the reservoir. However, in reservoirs having strata of varying permeability wherein a substantial proportion of the oil is present in the higher permeability zones, it is preferred that a first portion of the micellar solution be injected into the reservoir, followed by the injection of the aqueous plugging agent solution or solutions, then by a second portion of the micellar solution. In this manner, the first portion of the micellar solution preferentially enters the more permeable strata to mobilize and displace the oil therein, followed by the aqueous plugging agent solution or solutions which react to form a plugging material therein. The subsequently injected second portion of the micellar solution is diverted to the less permeable strata of the reservoir wherein it is then effective in mobilizing and displacing oil from these zones. In this latter embodiment of the invention, a plurality of successive slugs of micellar solution and aqueous plugging agent solution can be alternately injected to treat different strata.

More specifically, this invention involves a flooding process for recovering oil from heterogeneous reservoirs in which the micellar solution is diverted to the less permeable strata of the reservoir by selectively plugging the more permeable strata. In the practice of this invention, a slug of micellar solution is injected into the reservoir through one or more injection or input wells penetrating the oil-bearing formation and forced through the reservoir by subsequently injected flood water toward at least one production or output well similarly completed in the reservoir. As the flooding medium passes through the reservoir, it displaces oil from the strata that it contacts and moves it to the producing well whereupon the oil can be recovered by conventional means. One or more aqueous solutions of reagents that react in the reservoir to form a plugging material are injected through the injection well and into the reservoir prior to completing the injection of the micellar solution. The amount of reactive plugging agent injected need not be sufficient to provide complete shutoff of the more permeable strata, but only need be sufficient to adjust the permeability of these zones sufficiently to obtain more uniform permeability and more uniform distribution of the subsequently injected flooding media. The injection and production wells can be arranged in any convenient pattern designed to achieve maximum contact of the oil-bearing zones by the advancing flood front; such as the conventional "five-spot" pattern wherein a central producing well is surrounded by four somewhat symmetrically located injection wells. Another of the conventional flooding patterns that can be employed in the practice of this invention is the "line drive" pattern in which the injection wells are arranged in a line so that the injected flooding medium advances through the formation to displace oil toward one or more spaced production wells that can also be arranged in a line substantially parallel to the line of injection wells.

The micellar solution injected to miscibly displace oil from the reservoir can be an anhydrous or substantially anhydrous soluble oil, a water-containing soluble oil a water-external microemulsion, or an aqueous micellar solution. Such micellar solutions are well described in the literature, such as in U.S. Pat. Nos. 4,011,908 4,037,659 to Holm, the disclosures of which are incorporated herein by reference. The substantially anhydrous soluble oil contains less than 10 volume percent water, and preferably less than 5 volume percent water. The water-containing soluble oil can contain water in an amount up to the inversion concentration, i.e., that concentration of water at which the oil-external microemulsion is inverted to a water-external microemulsion. Inversion typically occurs at water concentrations between about 40 and 70 percent, depending upon the particular composition and the ambient conditions. The anhydrous soluble oil and water-containing soluble oil also contain about 30 to 90 volume percent hydrocarbon, about 0.5 to 8 volume percent stabilizing agent and about 4 to 30 volume percent surface active material. The water-external microemulsions typically contain more than about 40 volume percent water, usually more than 60 volume percent water and preferably 75 to 95 volume percent water. The aqueous micellar solutions are aqueous systems, substantially free of oil, in which the surface active agents are present in the form of macromolecular micelles. The water-external microemulsion and the aqueous micellar solution also contain about 0.5 to 8 volume percent stabilizing agent and about 2 to 25 volume percent surface active material.

Soluble oils are compunded from a hydrocarbon component, a stabilizing agent and a surface active material. Suitable liquid hydrocarbon components include crude petroleum, especially crude having an API gravity between about 27° and 50°; distillate petroleum fractions such as refined or semi-refined petroleum products for example gasoline, naphtha, stove oil, diesel and gas oil; residual products obtained by the distillation of lower boiling fractions from a crude petroleum, such as bunker fuel oil and other residual products; low value refinery by-products, such as catalytic cycle oil, lube oil extract, and the like; and liquefied normally gaseous hydrocarbons, such as propane, butane and LPG.

Stabilizing agents include partially oxygenated hydrocarbons such as monohydric aliphatic alcohols having 3 to 5 carbon atoms, dihydric alcohols containing 2 to 3 carbon atoms, aliphatic ketones containing 4 to 6 carbon atoms, glycol ethers containing 4 to 10 carbon atoms, polyhydric alkyl ethers such as dialkylene glycols containing 4 to 6 carbon atoms, and oxyalkylated alcohols containing 8 to 18 carbon atoms.

The surface active material can be an oil-soluble anionic surfactant such as a higher alkyl sulfonate. These sulfonates are preferably used in the form of their sodium salts. However, other salts can be used. Superior micellar solutions can be prepared by employing a combination of preferentially oil-soluble organic sulfonates and preferentially water-soluble organic sulfonates. A readily available source of alkyl aryl sulfonates are the natural petroleum sulfonates produced by sulfonating a relatively narrow boiling point range mixture of petroleum hydrocarbons.

The micellar solution compositions of this invention can be prepared by any of the conventional techniques. One suitable method is to prepare a substantially anhydrous soluble oil by admixing the hydrocarbon base stock, the stabilizing agent and the preferentially oil-soluble surface active material. Thereafter, the preferentially water-soluble surface active material, if used, is added. Water-in-oil microemulsions can be prepared by simply adding a desired amount of water to the substantially anhydrous soluble oil, or larger amount of water can be added to form a oil-in-water microemulsion. The aqueous micellar surfactant solution can be prepared by simply admixing suitable proportions of water, the selected surfactant, and optionally, an organic stabilizing agent. Preferably, the water employed in forming the microemulsion is a salt-containing fresh water having a dissolved salt content of less than about 15,000 p.p.m., and more preferably less than about 5,000 p.p.m. Water-soluble salts of a monovalent metal can be added to obtain a water having a desired salt content.

Any of a wide variety of known selective plugging agents can be employed in the plugging step of this invention. These agents are injected in liquid form, i.e., the plugging agent is a liquid, or is dissolved or dispersed in water, so that when pumped into the well it will preferentially enter into the more permeable strata open to the well whereupon it reacts to form a plugging material. Useful selective plugging agents include chemical agents that react with the reservoir rock, or with connate reservoir or injected fluids to form a precipitate or plugging deposit in the reservoir, exemplary of which are alkali metal hydroxides, sodium silicate, and the like; two or more reactive chemical agents injected successively, such as various water-soluble salts of polyvalent metals such as iron, aluminum, calcium, cobalt, nickel, copper, mercury, silver, lead, chromium, zinc, cadmium and magnesium which form a precipitate with separately injected aqueous solutins of sodium hydroxide, sodium carbonate, sodium borate, sodium bicarbonate, sodium silicate, sodium phosphate, or the potassium or ammonium salts of these anions; various polymeric materials that form substantially permanent plugging deposits in the reservoir, such as cross-linked polyacrylamide; and reactive agents wherein the gelation or precipitation is delayed until the agent is placed in the reservoir, such as hydraulic cements and delayed action silica gels. Also, various mixtures of these reactive plugging agents can be employed, such as admixtures of sodium silicate and polyacrylamide or cross-linked polyacrylamide, and admixtures of sodium silicates and hydraulic cement.

A preferred selective plugging agent is an aqueous solution of sodium silicate and a gelling agent such as an acid or an acid-forming compound, a water-soluble ammonium salt, a lower aldehyde, a polyvalent metal salt, or an alkali metal aluminate. Examplary gelling agents are sulfonic acid, hydrochloric acid, ammonium sulfate, formaldehyde, calcium chloride, aluminum sulfate and sodium aluminate. Preferred gelling agents are those containing a polyvalent cation. The sodium silicate reacts in the presence of the gelling agent to form a silica or silica alumina gel, or to precipitate the silicate as insoluble silicate.

The volume of plugging agent solution injected and the concentration of plugging agent in the plugging agent solution can vary over wide ranges depending upon the particular agent selected, the specific characteristics of the reservoir and the connate reservoir fluids, the magnitude and extent of the heterogeneity, and the degree of fluid shutoff desired. Where sodium silicate is employed as the plugging agent, the concentration of sodium silicate in the plugging solution can vary from about 1 to 30 weight percent, weaker plugs being formed at the lower concentration and treating costs increasing at the higher concentrations. Thus, it is preferred that the concentration of sodium silicate in the plugging solution injected into the formation be between about 3 and 15 weight percent, and preferably between about 3 and 10 weight percent. The molar ratio of sodium oxide to silica ($Na_2O/SiO_2$) in the silicate can vary within limits from about $1/1,5$ to about $\frac{1}{4}$ by weight. Preferably, however, the ratio should be from about $\frac{1}{3}$ to about $1/3.5$, i.e., it is preferred that the sodium silicate solution contains 3 to 3.5 parts of weight of silica ($SiO_2$) per part of sodium oxide ($Na_2O$).

Other types of silicates which can be used in the practice of this invention are the alkaline alkali metal silicates, i.e., an alkali metal silicate having a molar ratio of $M_2O/SiO_2$ of 1 and above, wherein M is an alkali metal atom, such as sodium, potassium, lithium, cesium and rubidium, exemplary of which are alkali metal orthosilicate, alkali metal metasilicate, alkali metal metasilicate pentahydrate, and alkali metal sequisilicate. Particular agents useful in the practice of the invention include sodium and potassium orthosilicate, sodium and potassium metasilicate, sodium and potassium metasilicate pentahydrate, and sodium and potassium sequisilicate. Sodium orthosilicate is a particularly preferred alkaline alkali metal silicate because of its relatively high pH.

The alkaline alkali metal silicates used in the practice of this invention are available in solid form, and the respective alkaline alkali metal silicate solutions can be prepared by dissolving an appropriate quantity of the alkaline metal silicate in water. However, in many cases it is more convenient and less costly to prepare the alkaline alkali metal silicate by adding caustic to an aqueous solution of a low-alkalinity alkali metal silicate having a $Na_2O/SiO_2$ ratio of less than 1.

A wide variety of reagents can be employed to react with the alkaline alkali metal silicate to form the mobility adjusting precipitate, inclusive of which are acids and acid precursors such as chlorine, sulfur dioxide, sulfur trioxide; water-soluble salts of bivalent metals such as the halide and nitrate salts of iron, aluminum, calcium, cobalt, nickel, copper, mercury, silver, lead, chromium, zinc, cadmium and magnesium; and water-soluble ammonium salts. Preferred agents for reaction with the alkaline alkali metal silicate are those containing a polyvalent cation, such as calcium chloride.

Preferably, approximately the same volumetric quantities of each aqueous reactant solution are injected in each injection cycle, with the concentration of the water-soluble agent that reacts with the alkaline alkali metal silicate being adjusted to provide sufficient agent to stoichiometrically react with the silicate.

Each slug of reactant solution is injected at conventional flood water injection rates such as rates of about 100 to 2,000 barrels per day for a period of about 1 hour to about 7 days, and preferably for a period of about 4 hours to 1 day. The water slug injected intermediate the slugs of reactive solutions can be injected in smaller volume. The following is a typical injection cycle:

| Slug | Time | |
|---|---|---|
| | Broad Range | Preferred Range |
| Alkaline alkali metal silicate solution | 1 hour to 7 days | 4 hours to 1 day |
| Water | 1 hour to 1 day | 1 to 8 hours |
| Aqueous solution of reactant | 1 hour to 7 days | 4 hours to 1 day |
| Water | 1 hour to 1 day | 1 to 8 hours |

It has been found in some instances the injection pressure increases during the alkaline alkali metal silicate solution injection step, and then decreases to its original value during the remaining injection steps of that cycle, rising again upon the next injection of alkaline alkali metal silicate solution. Thus, in some instances the slug injection times must be sufficiently short to prevent excessive injection pressures.

In a preferred mode of practicing the invention to recover oil from a subterranean reservoir, an aqueous solution of sodium orthosilicate is prepared having a sodium orthosilicate concentration selected to provide a pH sufficient to reduce the interfacial tension of the oil-water system to less than 5 dynes/cm. and preferably to a value of less than 2 dynes/cm. The sodium orthosilicate solution is injected into the reservoir through an injection well for a period of about 4 hours to 1 day, followed by water injection for about 1 hour to 8 hours, then by a slug of an aqueous solution containing a stoichiometric quantity of a second reactant such as calcium chloride substantially equal in volume to said slug of alkaline sodium orthosilicate solution, and then by the injection of water for about 1 hour to 8 hours. This cycle is repeated throughout the flooding operation, and oil and other produced fluids are recovered from a spaced production well. While the mobility-controlled caustic treatment can be followed by conventional water drive, it has been found in some instances that the subsequently injected flood water soon breaks through to the producing wells. Hence, it is preferred to maintain the above-described chemical injections for substantially the entire recovery operation.

It is well-known that the gelling of sodium silicate in the presence of certain gelling agents is delayed, i.e., gelling occurs at some time after the sodium silicate and gelling agent are admixed, and under some conditions gelling is delayed for up to 7 days. It is preferred that the conditions be selected in accordance with known techniques to delay gelling of the sodium silicate for a period sufficient for its injection into the reservoir immediately adjacent to the well, but yet not for a period that would unduly prevent continuance of the flooding operation. Thus, in most cases, it is preferred that the conditions be selected so that gelling is delayed for about one day, and is substantially completed within about 7 days.

Thus, it is apparent that any of a wide variety of settable liquids can be employed as the selective plugging agent injected in the plugging step of the process of this invention, it being required only that they react in the reservoir to form solids or gels that substantially reduce the permeability of the more permeable strata of the formation to the subsequently injected flooding media.

It is preferred that the injection of the selective plugging agent composition be followed by the injection of an inert spacer liquid, such as water, to displace the plugging agent compositions out of the well itself and back into the reservoir.

With many of the plug-forming compositions, reaction occurs upon contact of one plug-forming component with another plug-forming component. In such instances no shut in of the well is required following injection of the plug-forming compositions into the reservoir, i.e., the next step of the recovery process can be started immediately. With other plug-forming compositions, reaction is slower and the well should be shut in for about 2-24 hours after the plug-forming components are injected to allow the plug to form before proceeding with the next step of the recovery process.

After the plug has formed and before additional micellar solution is injected, the well is produced to remove from the reservoir unreacted polyvalent cations which would otherwise contact and react with the surfactant component of the subsequently injected micellar solution. Production is carried out for a length of time and at a rate dependent upon the characteristics of the reservoir as well as the volume and nature of the plug-forming components employed. Generally, production of the well for about 8 to 24 hours at a rate of about 0.1 to 1 gallons per minute will remove enough of the unreacted polyvalent cations so that any reaction thereof with subsequently injected micellar solution which might occur does not adversely affect the effectiveness of the micellar solution in displacing oil from the reservoir. It is preferred that the well be produced until the polyvalent cation content of the produced fluids falls below about 25 p.p.m. During production the concentration of polyvalent cations in the produced fluids can be monitored by any one of a number of well-known chemical tests such as ASTM Designation D511-76, Standard Methods of Test for Calcium Iron and Magnesium Ion in Water, 1976 *Annual Book of ASTM Standards,* Part 31, Water, pp. 250 to 257.

In the practice of the method of this invention wherein the plugging step is conducted prior to injection of the micellar solution, there is first introduced into a heterogeneous or highly stratified reservoir a quantity of the aqueous solution of plugging agent sufficient to penetrate into the more permeable strata of the reservoir a substantial distance from the injection well. It is preferred that the aqueous solution penetrate into the more permeable strata a distance of at least 10 feet from the injection well, and more preferably a distance of about 30 feet, although it is recognized that in some cases sufficient plugging solution can be injected to pass through the formation to one or more spaced production wells, which can be located several hundred feet or more from the injection well.

Upon completion of the plugging step, the micellar solution is injected into the reservoir through one or more injection wells in an amount sufficient to establish in the reservoir a bank which can be displaced through the reservoir. Satisfactory oil recoveries can usually be obtained by the injection of 0.01 to 0.15 reservoir pore volume of micellar solution. Aqueous flooding medium is then injected to displace the micellar solution toward at least one production well spaced apart in the reservoir from the injection well, from which fluids are produced in conventional manner. The aqueous flooding medium can comprise water or brine, and can be made more viscous by the addition of a thickening agent such as sugar, dextran, carboxymethyl cellulose, amines, glycerine, guar gum and mixtures of these agents. Also, the aqueous flooding medium can be rendered more viscous by the addition of a small amount of a water-soluble polymer, such as polyacrylamide, and particularly a partially hydrolyzed polyacrylamide. In the preferred method of practicing this invention thickening agent is added to only an initial portion of the flood water. Thus, in this preferred embodiment, 0.01 to 0.15 reservoir pore volume of micellar solution is injected into the reservoir and followed by 0.1 to 1.0 reservoir pore volume of thickened aqueous flooding medium. Thereafter, water or brine is injected to drive the previously injected fluids toward at least one spaced production well.

Where the plugging step is conducted subsequent to the injection of an initial portion of the micellar solution, it is preferred that about 0.01 to 0.08 reservoir pore volume of micellar solution be injected into the reservoir, and that the micellar solution injection be interrupted and the aqueous plugging agent solution be injected in the previously described manner. Thereafter, the final portion of the micellar solution is injected and the flood concluded by injecting the aqueous flooding medium. Also, a plurality of successive slugs of micellar solution and plugging agent solution can be alternately injected into the reservoir.

The amount of selective plugging agent required in any well treatment is best determined from a knowledge of the characteristics of the particular reservoir to be treated. However, in many applications, the desired treatment can be obtained by injecting about 5 to 50 barrels of plugging agent solution per vertical foot of interval to be treated.

The invention is further described by the following examples which are illustrative of specific modes of practicing the invention and are not intended as limiting the scope of the invention as defined by the appended claims.

EXAMPLE 1

This example illustrates the practice of the process of this invention in recovering oil from a heterogeneous reservoir having a highly permeable streak between an injection and a production well and wherein a small amount of oil is contained in the highly permeable streak. There is injected into the injection well 0.001 pore volume of an aqueous alkaline sodium orthosilicate solution prepared by admixing 0.958 parts by weight of a commercial low alkalinity sodium silicate solution containing 8.9 weight percent $Na_2O$ and 28.7 weight percent $SiO_2$ ($Na_2O/SiO_2$ weight ratio of 0.31) marketed by the Philadelphia Quartz Company under the trademark PQ Sodium Silicate N, with 1.35 parts by weight of 50 weight percent sodium hydroxide solution. This is equivalent to 10 barrels of orthosilicate solution per vertical foot of interval treated. Next there is injected 100 barrels water as a spacer followed by 1,000 barrels of an aqueous solution containing 0.07 weight percent of calcium chloride gelling agent and finally 500 barrels water as a spacer. The well is then shut in for 24 hours to allow time for a silicate plug to form. The well is then produced at a rate of 500 barrels per day for 24 hours while the calcium ion content of the produced fluids is monitored to substantially completely remove the previously injected unreacted calcium ions from the reservoir.

Next, there is injected .03 pore volume of an oil-external soluble oil prepared by admixing 33.7 volume percent of a 37° API gravity Texas crude oil; 6.1 volume percent of preferentially oil-soluble, surface active, alkyl aryl petroleum sulfonates marketed by the Sonneborn Division of Witco Chemical Company, Inc. under the trademark Petronate RHL; 3.8 volume percent of preferentially water-soluble, surface active, alkyl aryl petroleum sulfonate marketed by the Sonneborn Division of Witco Chemical Company Inc. under the trademark Petronate 30; 1.4 volume percent of ethylene glycol monobutyl ether marketed by Union Carbide Company under the trademark butyl Cellosolve; and 55 volume percent of fresh water containing 1,000 p.p.m. of sodium chloride. Petronate RHL is an oil solution containing about 62 weight percent of mixed preferentially oil-soluble alkyl aryl sulfonates and not more than about 5 weight percent water. Petronate 30 is an aqueous solution containing 30 weight percent preferentially water-soluble alkyl aryl sulfonates having an average molecular weight in the range of 330 to 350 and containing about 50 weight percent water.

Finally, there is injected 0.8 pore volume reservoir brine containing polyacrylamide polymer thickener as a drive fluid. During the injection of the drive fluid into the injection well, substantial amounts of oil are produced at the production well indicating that a satisfactory plug of the highly permeable streak has been formed and that there has been no appreciable precipitation of the surface active agent component of the soluble oil by reaction with previously injected calcium ions.

EXAMPLE 2

This example illustrates the practice of the process of this invention in recovering oil from a heterogeneous reservoir wherein a substantial portion of the oil is contained in the more permeable strata. There is injected into the injection well 0.01 pore volume of a first portion of a substantially anhydrous soluble oil prepared by admixing 64.8 volume percent of 37° API gravity Texas crude oil; 11.1 volume percent of a mixture of preferentially oil-soluble alkyl aryl sulfonates marketed by the Sonneborn Division of Witco Chemical Company, Inc. under the trademark Petronate CR; 8.1 volume percent of a mixture of preferentially water-soluble alkyl aryl sulfonates marketed by Sonneborn under the trademark Petronate 30; 6.0 volume percent of ethylene glycol monobutyl ether; and 10.0 volume percent of fresh water. Petronate CR is an oil solution containing about 62 weight percent of alkyl aryl sulfonate having an average molecular weight in the range of 490 to 510 and up to 5 weight percent water. Petronate 30 is described in the preceeding example.

The injection of the substantially anhydrous soluble oil is then stopped and there is injected 0.0005 pore volume of an aqueous solution containing 0.4 percent by weight of a sodium silicate solution and 0.01 percent by weight calcium chloride gelling agent; the two solutions being separated by 50 barrels of fresh water as a spacer. The sodium silicate solution is an aqueous commercial sodium silicate containing about 37.6 percent by weight sodium silicate having a silica to sodium oxide ($SiO_2/Na_2O$) ratio of 3.22 marketed by Philadelphia Quartz Company under the designation N-grade sodium silicate solution. This is equivalent to 10 barrels of silicate solution per vertical foot of internal treated. The well is shut in for 24 hours to allow time for the calcium silicate plug to form. The injection well is then produced at a rate of 500 barrels per day for 24 hours while the calcium ion content of the produced fluids is monitored to substantially completely remove the previously injected unreacted calcium ions from the reservoir. Next, 0.02 pore volume of a second portion of the above-described substantially anhydrous soluble oil is injected followed by 1.0 pore volume reservoir brine containing polyacrylamide polymer thickener as a drive fluid. Increased oil production and decreased water production at the production well is noted during the injection of the brine drive fluid indicating: increased flow of reservoir oil through the less permeable portions of the reservoir; decreased flow of injected drive brine through the more permeable portions of the reservoir; and negligible reaction of the surface active components of the soluble oil with unreacted calcium ions remaining in the reservoir following the formation of the plug and production of the injection well to remove the unreacted calcium ions.

While particular embodiments of the invention have been described, it will be understood, of course, that the invention is not limited thereto since many modifications can be made and it is intended to include within the invention such modifications as are within the scope of the claims.

The invention having thus been described, I claim:

1. In the method for recovering oil from a heterogeneous subterranean reservoir in which there is injected into the reservoir through an injection well in communication therewith a micellar solution, an aqueous plug-forming composition containing a polyvalent cation which is injected before the injection of all of the micellar solution, and an aqueous flooding medium, the improvement which comprises: producing the injection well after injection therein of the plug-forming composition to remove from the reservoir unreacted polyvalent cations.

2. The method defined in claim 1 wherein the well is produced until the concentration of unreacted polyvalent cation in the produced fluids falls below about 25 parts per million.

3. The method defined in claim 1 wherein the well is produced at a rate of 0.1 to 1 gallon per minute for from 8 to 24 hours.

4. The method defined in claim 1 wherein the aqueous plug-forming composition is injected prior to the injection of the micellar solution.

5. The method defined in claim 1 wherein the aqueous plug-forming composition is injected following the injection of a first portion of the micellar solution and prior to the injection of a second portion of the micellar solution.

6. The method defined in claim 1 wherein the micellar solution is selected from the group consisting of substantially anhydrous soluble oil, water-containing soluble oil, water-external microemulsion and aqueous micellar solution.

7. The method defined in claim 1 wherein the aqueous plug-forming composition contains alkali metal or ammonium hydroxide, carbonate, bicarbonate, silicate or phosphate.

8. The method defined in claim 7 wherein the aqueous plug-forming composition contains sodium silicate.

9. The method defined in claim 7 wherein the aqueous plug-forming composition contains an alkaline alkali metal silicate having a molar ratio of $M_2O/SiO_2$ of 1 and above, wherein M is an alkali metal atom.

10. The method defined in claim 1 wherein the aqueous plug-forming composition contains cross-linked polyacrylamide, hydraulic cement or delayed action silica gel.

11. The method defined in claim 1 wherein the polyvalent cation is selected from the group consisting of aluminum, calcium, cobalt, nickel, copper, mercury, silver, lead, chromium, zinc, cadmium and magnesium.

12. The method defined in claim 11 wherein the polyvalent cation is calcium.

13. In the method of recovering oil from a highly heterogeneous subterranean reservoir containing strata of widely varying permeabilities in which there is injected into the reservoir through an injection well in communication with the said strata a micellar solution, an aqueous plug-forming composition containing a polyvalent cation which composition enters the more permeable strata and reduces the permeability of these strata so that all strata in the reservoir are more uniform in permeability, and an aqueous flooding medium, the improvement which comprises: producing the injection well after injection therein of the plug-forming composition and prior to the injection therein of at least a portion of the micellar solution, said production being carried out at a rate for a length of time sufficient to remove from the reservoir unreacted polyvalent cations.

14. The method defined in claim 13 wherein the injection well is shut in following injection of the plug-forming composition for a period of time sufficient for a plug to form.

15. The method defined in claim 13 wherein the well is produced until the concentration of unreacted polyvalent cation in the produced fluids falls below about 25 parts per million.

16. The method defined in claim 13 wherein the well is produced at a rate of 0.1 to 1 gallon per minute for from 8 to 24 hours.

17. The method defined in claim 13 wherein the aqueous plug-forming composition is injected prior to the injection of the micellar solution.

18. The method defined in claim 13 wherein the aqueous plug-forming composition is injected following the injection of a first portion of the micellar solution and prior to the injection of a second portion of the micellar solution.

19. The method defined in claim 13 wherein the micellar solution is selected from the group consisting of substantially anhydrous soluble oil, water-containing soluble oil, water-external microemulsion and aqueous micellar solution.

20. The method defined in claim 13 wherein the aqueous plug-forming composition contains alkali metal or ammonium hydroxide, carbonate, bicarbonate, silicate or phosphate.

21. The method defined in claim 20 wherein the aqueous plug-forming composition contains sodium silicate.

22. The method defined in claim 20 wherein the aqueous plug-forming composition contains an alkaline alkali metal silicate having a molar ratio of $M_2O/SiO_2$ of 1 and above, wherein M is an alkali metal atom.

23. The method defined in claim 13 wherein the aqueous plug-forming composition contains cross-linked polyacrylamide, hydraulic cement or delayed action silica gel.

24. The method defined in claim 13 wherein the polyvalent cation is selected from the group consisting of aluminum, calcium, cobalt, nickel, copper, mercury, silver, lead, chromium, zinc, cadmium and magnesium.

25. The method defined in claim 24 wherein the polyvalent cation is calcium.

UNITED STATES PATENT OFFICE
CERTIFICATE OF CORRECTION

Patent No. 4,140,183   Dated February 20, 1979

Inventor(s) LeRoy W. Holm

It is certified that error appears in the above-identified patent and that said Letters Patent are hereby corrected as shown below:

In the specification, column 6:

Line 22 - "1,5" should be "1.5"

Line 25 - "of" first occurrence, should be "by"

Lines 22 and 23 - "by weight" should be omitted.

Signed and Sealed this

Fourteenth Day of August 1979

[SEAL]

Attest:

LUTRELLE F. PARKER
*Attesting Officer*   *Acting Commissioner of Patents and Trademarks*